Sept. 26, 1961 H. J. STARK ET AL 3,001,213
LAMINATED BONDINGS MEMBER
Filed April 18, 1957
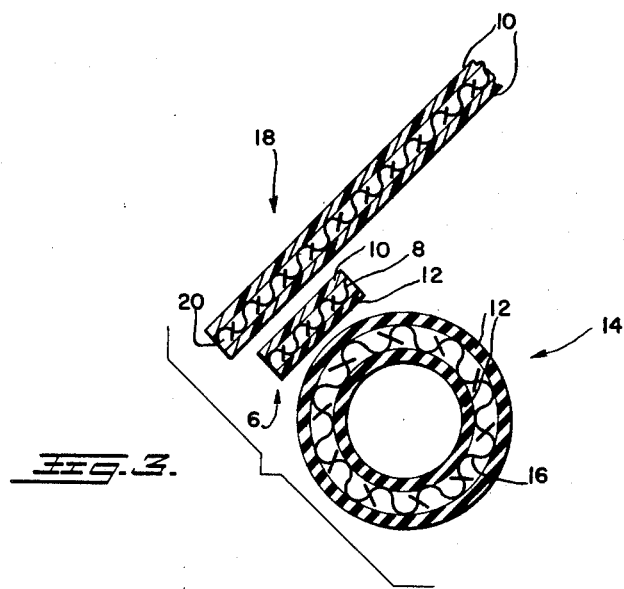
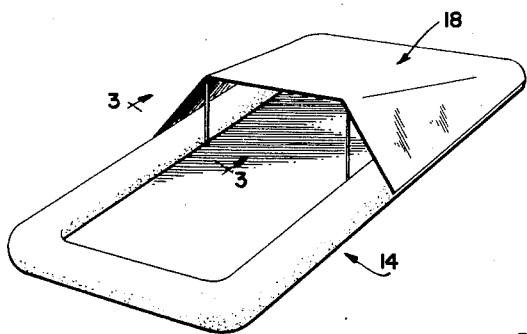
INVENTORS
HOWARD J. STARK
CHARLES E. MILLER
BY George Sipkin
B. L. Zangwill
ATTORNEYS

United States Patent Office 3,001,213
Patented Sept. 26, 1961

3,001,213
LAMINATED BONDINGS MEMBER
Howard J. Stark, 920 N. Lebanon St., Arlington, Va., and Charles E. Miller, R.F.D. 1, Rockville, Md.
Filed Apr. 18, 1957, Ser. No. 653,715
1 Claim. (Cl. 9—11)
(Granted under Title 35, U.S. Code (1952), sec. 266)

The invention described herein may be manufactured and used by or for the Government of the United States of America for governmental purposes without the payment of any royalties thereon or therefor.

This invention relates to a method and means for chemically bonding together layers of plastic material that are lacking in chemical affinity for one another, and more particularly, a method and means for bonding together layers of vinyl resin plastic and synthetic rubber of the class comprising polymerized 2-chlorobutadiene 1,3 more commonly referred to as neoprene.

It is pointed out that in certain instances it is desirable to chemically bond together layers of dissimilar plastic materials. An example of such a situation is found in the inflatable, rubber life raft art where the ring or body of the raft is made of a neoprene coated fabric material and said raft is provided with a canopy member which is made of a vinyl plastic covered fabric. The canopy is made of vinyl plastic covered fabric, since said vinyl plastic covered fabric is considerably lighter per unit volume than the neoprene coated fabric of which the body of the raft is made. It is desirable to make the canopy as light as possible in order that the raft will not be rendered top heavy and therefore subject to capsizement.

However, it has been found that satisfactorily bonding together vinyl plastic and neoprene is a quite difficult problem, since those adhesives particularly adapted for bonding together either layers of vinyl plastic or layers of neoprene respectively are not suitable for bonding together vinyl plastic and neoprene, since such bonds are found to be relatively weak inasmuch as the adhesive adapted for use with one of said plastic materials is not suitable for use with the other and vice versa.

Attempts to produce adhesives and/or bonding techniques that will render it practical to bond together vinyl plastic and neoprene have not met with success, the bonds having been produced by prior art methods being of insufficient strength to render the resultant products practical.

It is an object of this invention to provide a method and means for chemically bonding materials that normally do not have an affinity for one another.

It is another object of this invention to provide a method and means for chemically bonding a vinyl resin member and a neoprene member, the latter being chemically known as polymerized 2-chlorobutadiene, 1,3.

It is still another object of this invention to provide an inflatable life raft made of either synthetic rubber, or a synthetic rubber coated fabric, with a canopy of either vinyl resin or a vinyl resin coated fabric, said canopy being chemically bonded to said raft.

In accordance with this invention, a layer of either nylon or cotton, woven fabric is coated on one surface with a layer of vinyl resin and on the other surface with a layer of polymerized 2-chlorobutadiene 1,3 the latter material being better known as synthetic rubber or neoprene. A strip of the material described above and hereinafter designated as a bonding member, is adapted to be interposed between members made of vinyl resin and synthetic rubber respectively, with that surface of the bonding member covered with synthetic rubber being placed opposite the synthetic rubber member and the face of the bonding member covered with vinyl resin being placed opposite the vinyl resin covered member. A suitable adhesive is applied to either one or both of the vinyl surfaces and an adhesive suitable for bonding synthetic rubber is applied to one or both of the synthetic rubber surfaces and the members are then pressed together. When the respective adhesive materials set, or dry, the three members, namely the vinyl member, the bonding member, and the synthetic rubber member, will be firmly bonded together. The laminated member made in accordance with this invention may also be used as a bonding member by being interposed between a vinyl resin member and a synthetic rubber member and bonded to said members by the application of heat and pressure to all three.

Other objects and many of the attendant advantages of this invention will be readily appreciated as the same becomes better understood by reference to the following detailed description when considered in connection with the accompanying drawing in which like reference numerals resignate like parts throughout the figures thereof and wherein:

FIG. 1 is a sectional view of a laminated member made in accordance with this invention;

FIG. 2 is a perspective view of one application of the invention; and

FIG. 3 is an exploded sectional view taken on line 3—3 of FIG. 2.

Referring now to the drawings wherein like reference characters designate like or corresponding parts throughout the several views, there is shown in FIG. 1 a laminated bonding member 6 produced in accordance with this invention. The bonding member 6 consists of a layer of either nylon or cotton woven fabric 8 having bonded to one surface thereof a layer of vinyl resin 10 and to the opposite face thereof a layer of synthetic rubber 12.

The type of nylon or cotton fabric utilized, and the amount of coating on each side, is a matter of choice, and the following are given by way of example only:

|  | Strength (lbs.) | Weight, oz./sq. yd. | Weight (Vinyl), oz./sq. yd. | Weight (Neoprene), oz./sq. yd. |
|---|---|---|---|---|
| Nylon (1) | 40 x 40 | 0.90 | 2 | 2 |
| Nylon (2) | 150 x 150 | 2.50 | 3 | 3 |
| Cotton (3) | 40 x 40 | 2.10 | 2.7 | 2.7 |
| Cotton (4) | 80 x 80 | 4.50 | 2.7 | 2.7 |

The respective coatings 10 and 12 on the fabric layer 8 are applied in such a way that they permeate the fabric to a substantial degree. An example of a suitable vinyl coating is a compound consisting of 80 to 90% polyvinyl chloride, 20–10% polyvinyl acetate and 10–30% plasticizer such as tricresyl phosphate. The synthetic rubber coating 12 consists of polmerized 2-chlorobutadiene 1,3, more commonly known as neoprene. It is pointed out that the fabric material 8 may be provided with either balanced or unbalanced coatings, that is, the weight of coating per square yard may be the same on both sides or it may be different.

The above figures indicating the weight of vinyl resin and synthetic rubber applied to the respective sides of the fabric 8 are given by way of example only, the invention not being limited to the specific weights or concentrations indicated. It is pointed out that the amount of vinyl resin and synthetic rubber applied to the respective sides of the fabric layer may be varied to suit the particular use to which the laminated strip 6 is to be put. It is also pointed out that while nylon and cotton fabrics have been referred to above, the invention can be practiced just as satisfactorily by use of glass cloth. Where greater strength is required glass cloth should be used, however, if the fabric is subject to flexing, creasing and/or continuous abrasion, nylon and cotton are superior.

FIG. 2 shows an inflatable life raft 14 made of a synthetic rubber coated fabric, and provided with a canopy 18 made of a vinyl resin coated fabric, said canopy 18 being bonded at certain of its edges to the body of the raft, by use of the laminated bonding member 6, in a manner hereinafter described.

As shown in FIG. 3 in cross-section, the raft 14 consists of an inflatable member made of a layer of fabric 16 coated on both faces with synthetic rubber, as for example, the type commonly known as neoprene. The raft 14 is provided with a canopy 18 that extends over the upper portion thereof and is adapted to be used as a shelter for the occupants of said raft. The canopy 18 consists of a layer of fabric 20 coated on its opposite faces with a vinyl resin 10 of the same type as that used on one of the faces of the laminated bonding member 6. Prior to assembly, a suitably sized and shaped portion of the bonding member 6 is placed between the canopy 18 and the adjacent portion of the inflatable life raft 14 in the manner shown in FIG. 3. The bonding member 6 is so arranged that the synthetic rubber surface thereof is juxtaposed to the synthetic rubber surface of the life raft 14 while the vinyl surface thereof is juxtaposed to the under portion of the vinyl covered canopy 14.

A suitable vinyl resin adhesive is applied to the vinyl resin surface 10 of the bonding member 6 and/or the adjacent vinyl surface of the canopy 18. One example of a suitable solvent consists of a solution, in a suitable vitreous solvent, of about 15 to 25% cyclohexanone plus 1 to 5% tetrahydrofurane. The adjacent synthetic rubber surfaces of the bonding member 6 and the life raft 14 are coated with an adhesive suitable for bonding together layers of synthetic rubber, as for example, a phenolic resin of suitable type. After the suitable adhesives have been applied to the respective vinyl resin and synthetic rubber surfaces, the canopy 18, patch 6 and the life raft 14 are tightly pressed together, and so held, until the respective adhesives have had adequate time to set, whereby a firm bond is obtained between the three members 18, 6 and 14.

An alternative method of utilizing the applicants' bonding member 6 consists of arranging said member, relative to the members to be bonded together, in the same way as shown in FIG. 3, but instead of using adhesives, said members 18, 6, and 14 are pressed tightly together and the like plastic layers are fused by application of heat and pressure.

Thus it can be seen that the applicants have provided a means for chemically bonding together plastic materials that normally are lacking in affinity for one another; as for example, vinyl resin and synthetic rubber. Specifically, it is pointed out that by use of the applicants' invention a chemical bond is obtained, whereby plastic materials of a like nature only are bonded together. In this manner a considerably stronger bond is obtained between dissimilar materials, than would be the case if an attempt were made to directly bond together said dissimilar materials.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention, as set forth in the appended claim.

What is claimed is:

In an inflatable boat comprising a body of fabric coated with synthetic rubber of the type known as polymerized 2-chlorobutadiene 1,3 and a canopy member composed of fabric coated with polyvinyl chloride-polyvinyl acetate resin material, the improvement comprising a bonding structure between said body and said canopy member, said canopy member being bonded to said body on three of its four edges, said bonding structure comprising a sheet of woven fabric having bonded to one surface thereof a layer of polyvinyl chloride-polyvinyl acetate resin material and having bonded to its opposite face a layer of synthetic rubber of the type known as polymerized 2-chlorobutadiene 1,3; said resin material on being bonded to the layer of resin on said bonding structure and said synthetic rubber on said body being bonded to the layer of synthetic rubber on said bonding structure.

References Cited in the file of this patent

UNITED STATES PATENTS

| | | |
|---|---|---|
| 1,802,985 | Semon | Apr. 28, 1931 |
| 2,405,943 | Doering et al. | Aug. 20, 1946 |
| 2,418,904 | Rugeley et al. | Apr. 15, 1947 |
| 2,576,945 | Klingel | Dec. 4, 1951 |
| 2,605,514 | Eshenaur et al. | Aug. 5, 1952 |
| 2,629,678 | Thompson et al. | Feb. 24, 1953 |
| 2,662,932 | Warner | Dec. 15, 1953 |
| 2,690,769 | Brown | Oct. 5, 1954 |
| 2,706,699 | Plansoen et al. | Apr. 19, 1955 |
| 2,729,585 | Gruber et al. | Jan. 3, 1956 |
| 2,759,866 | Seymour | Aug. 21, 1956 |
| 2,766,164 | Salem | Oct. 9, 1956 |
| 2,775,537 | Wilson et al. | Dec. 25, 1956 |